I. J. MOSSMAN.
RAILROAD VELOCIPEDE.
APPLICATION FILED APR. 28, 1911.
1,013,041.
Patented Dec. 26, 1911.
2 SHEETS—SHEET 1.
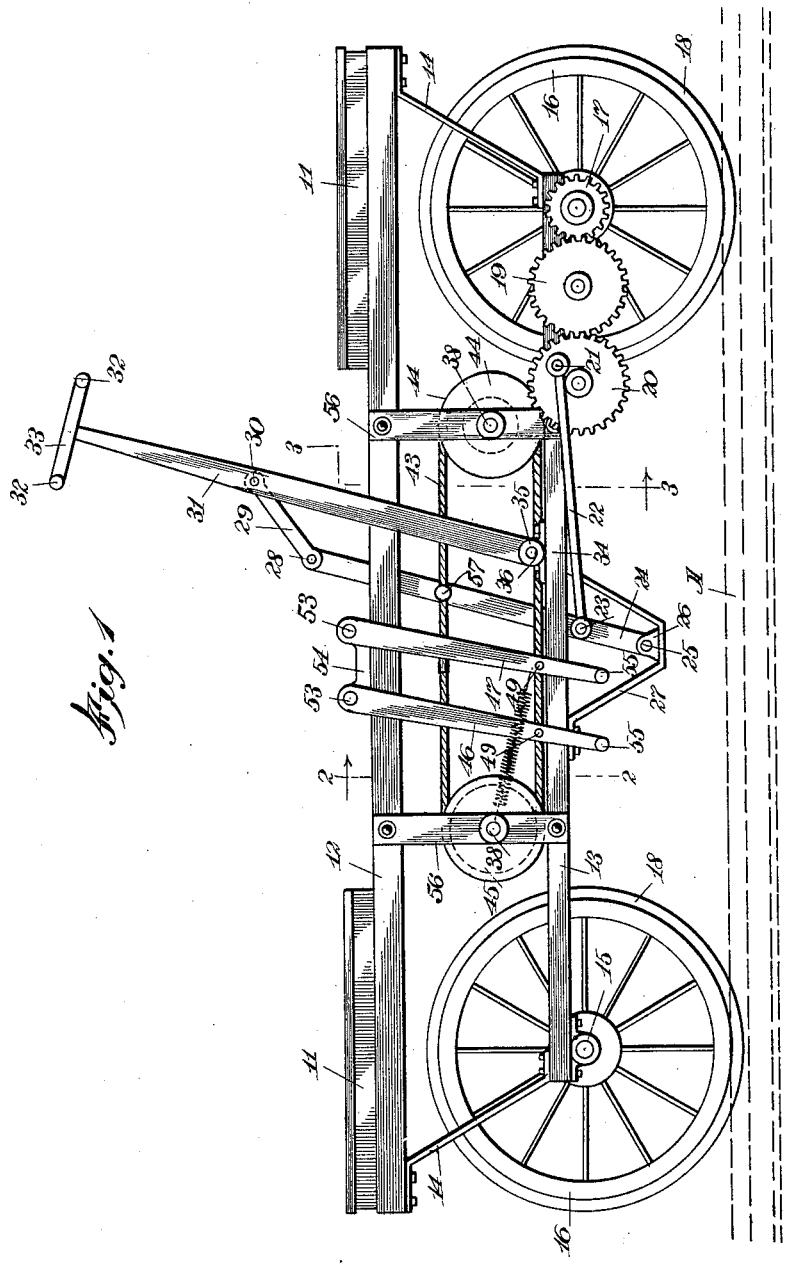
WITNESSES
INVENTOR
Isaac J. Mossman
BY
ATTORNEYS

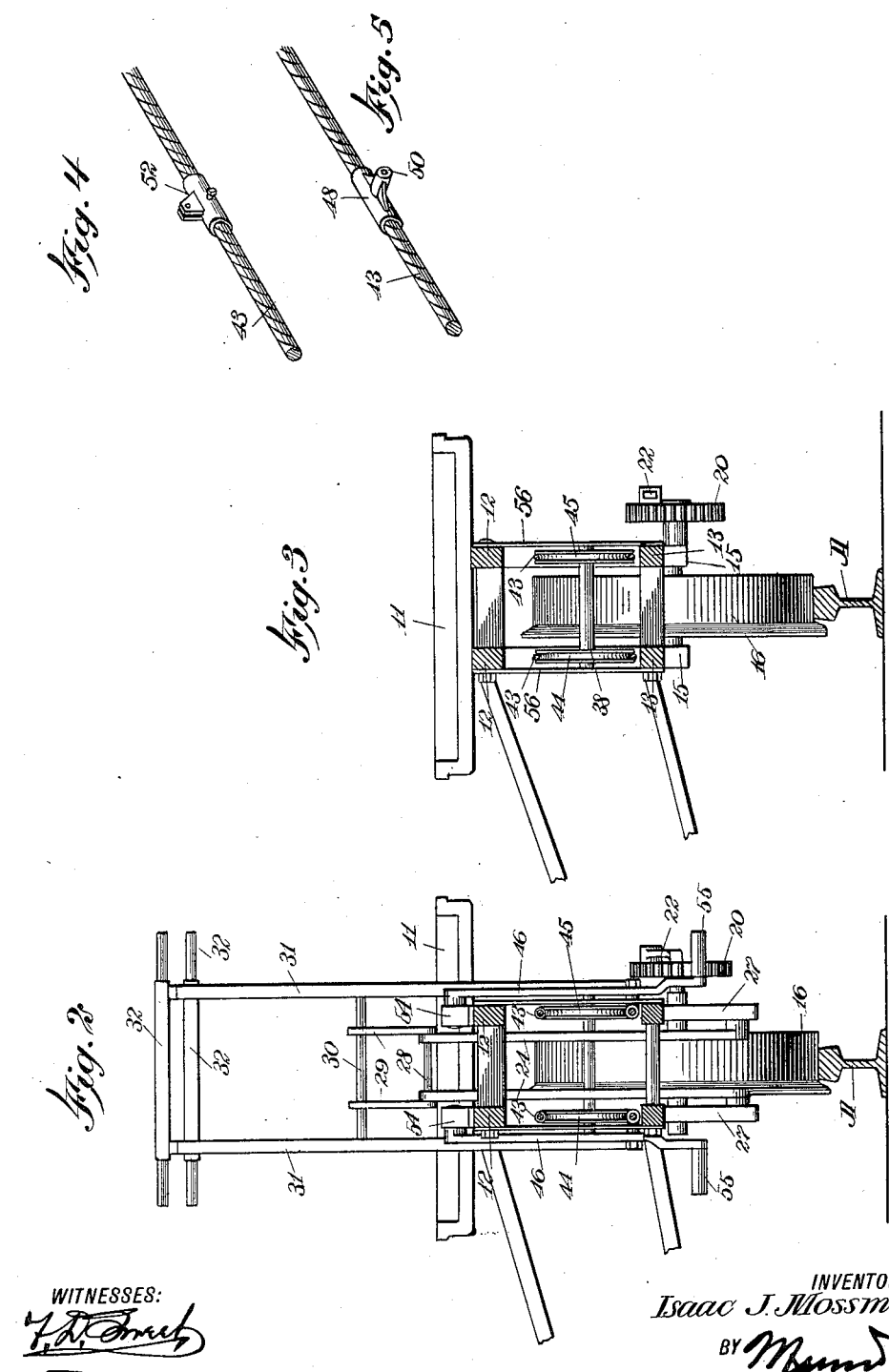

UNITED STATES PATENT OFFICE.

ISAAC JAY MOSSMAN, OF TACOMA, WASHINGTON.

RAILROAD-VELOCIPEDE.

1,013,041. Specification of Letters Patent. Patented Dec. 26, 1911.

Application filed April 28, 1911. Serial No. 623,837.

*To all whom it may concern:*

Be it known that I, ISAAC J. MOSSMAN, a citizen of the United States, and a resident of Tacoma, in the county of Pierce and State of Washington, have invented a new and Improved Railroad - Velocipede, of which the following is a full, clear, and exact description.

Among the principal objects which the present invention has in view are: to provide a vehicle of the character mentioned with means for applying power by both foot and hand, and also to furnish means for amplifying or augmenting the power when an additional rider is carried on the vehicle; and to provide a construction of propelling levers which coact to materially augment the propulsive power applied.

One embodiment of the present invention is disclosed in the structure illustrated in the accompanying drawings, in which like characters of reference denote corresponding parts in all the views, and in which—

Figure 1 is a side elevation of a velocipede constructed and arranged in accordance with the present invention; Fig. 2 is a vertical cross section taken on the line 2—2 in Fig. 1; Fig. 3 is a vertical cross section taken on the line 3—3 in Fig. 1; Fig. 4 is a detail view, in perspective, showing a clamp for holding the cable in operative relation with a return spring of the intermittent drive; Fig. 5 is a detail view in perspective of a coupling clamp for engaging the driving cable with foot power levers.

As shown in the drawings, and particularly in Fig. 1 thereof, the velocipede frame is provided with two seats 11. The seats 11 are surmounted on side bars 12. The side bars 12 are connected with the hounds 13 by means of brackets 14. If it is desired to form an easy riding body the brackets 14 may be constructed from spring material and bent to compress under the weight applied on the side bars 12. The hounds 13 are provided with bearing boxes 15, which boxes are fixedly secured to the under side of the said hounds. The axles of the wheels 16 are mounted in the boxes 15, one of said axles having fixedly attached thereto a pinion 17. The wheels 16 are of usual construction provided for rolling on railway tracks, and differ from the ordinary wheel in the provision of the flanges 18 whereby they are retained on and guided by the railway track A. The pinion 17 is connected by means of a transmission gear wheel 19 to a crank driven gear wheel 20. The driving power for the velocipede is primarily imparted to the crank wheel 20. In the accompanying drawings two forms of power production and transmission mechanisms are shown. These two mechanisms may be denominated the hand power driving mechanism and the foot power driving mechanism. The hand power driving mechanism is connected to the wheel 20 by means of crank pins 21 and pitman rods 22 pivotally connected therewith. The pitman rods 22 are pivotally mounted on pins 23 set out from the sides of two levers 24. The levers 24 are pivoted at 25 in foot blocks 26, which blocks are carried in stirrup brackets 27. The stirrup brackets 27, of which there are two, are suspended from each of the hounds 13, as seen best in Fig. 2 of the drawings. The levers 24 are extended above the foot blocks 26, as best seen in Fig. 1 of the drawings, and are pivotally connected at 28 to links 29. The links 29 are pivotally connected by means of a cross bar 30 to the hand levers 31. The hand levers 31 are provided at the upper end with two hand bars 32, which are connected by means of side bars 33 with the levers 31, as shown in Figs. 1 and 2 of the drawings. Each lever 31 is pivoted upon a foot block 34, fixedly mounted on the hounds 13, said levers being provided with bearings 35 to fit the pivot pins 36 set out from the said blocks 34.

The foot power driving mechanism disclosed in the drawings consists primarily in the foot levers 46 and 47. The levers 46 and 47 are pivotally connected to the blocks 54 which are mounted upon the side bars 12. Each of the levers 46 and 47 is connected by means of a pin 49 to an endless cable 43. The cables 43 are each provided with a clamp 48 having extended therefrom a bracket 50 perforated to receive the pins 49. The cables 43 are reeved upon the pulleys 44 and 45, said pulleys being fixedly mounted upon the shafts 38. The shafts 38 are supported in bearings in the braces 56 connecting the side bars 12 and the hounds 13. The cables 43 are each fixedly connected to one of the levers 24 by means of a pin 57, as best seen in Fig. 1 of the drawings. A spiral spring 51 is employed by me to maintain the proper tension on the cable 43 and to take up any slack which may be produced therein when the velocipede is used by a simple operator. The spring 51 is secured at 49 to the lever 47.

The operation of a velocipede constructed and arranged as set forth and as shown in the accompanying drawings is as follows: When the velocipede is driven by one person, that person is seated on the seat 11 face forward. The rider is within easy grasp of the hand bar 32 nearest his seat. His feet rest upon the treadles 55 of the lever 46 which is farthest from the seat 11 occupied by him. With the hand bar and lever 31 connected therewith being thrown forward, the operator braces himself for the pull by pushing against the treadles 55 of the lever 46, pulling at the same time upon the hand bar 32 and the lever 31. By means of the connecting links 29 the levers 24 are rocked on their pivots 25, forcing the pitman rods 22 backward to rotate the wheel 20, and therethrough, the wheels 19 and pinion 17. The pinion 17 being rigidly mounted on the shaft of the driving wheel 18 the velocipede is caused to roll in the direction to which the rotation is imparted. The momentum being established the crank pin 21 is carried over the dead center, and when the operator now pushes forward on the hand bar 32 and the lever 31 the rotation of the wheel 20 is maintained substantially unbroken. The power transmitted by the legs through the levers 46 is by means of the cable 43 which is anchored upon the lever 24 by the pin 57. It will be understood that the levers 46 are only employed as means for driving the velocipede when and as the hand bar 32 and the lever 31 are drawn toward the single operator.

When two operators are employed the second operator sits on the advance seat 11 facing toward the rear of the velocipede, and facing likewise the lever 31 and the hand bars 32 mounted thereon. When grasping the second of the hand bars 32, and the one nearest the front seat, the second operator rests his feet upon the treadles 55 of the lever 47. In this position the two riders coöperate, each alternately pulling upon his hand bar 32 and at the same time pushing in a bracing manner upon the foot treadles 55 and upon the levers 46 and 47. In this manner it will be noted that when there are two riders the cranking operation upon the wheel 20 is continuously maintained, and that in each movement of the lever 31, whether being forced to the front or rear, is employed to exert the full cranking power upon the pitman rods 22.

The disposition of the various levers and the ratios in the lengths thereof are relied upon to augment the power applied by hand and foot. In the approved construction I form the lever 31, 30 inches in length and arrange the connection with the link 29 on the said lever so that 18 inches of the said length is disposed between the said connection with the link and the pin 36. The link 29 I prefer should be 6 inches in length. The lever 24 is formed 22 inches long. The bracket 27 I construct to extend 8 inches below the hounds 13. The pitman rod 22 is connected to the lever 24 at 7 inches above the pivot 25. The levers 46 and 47 are 12 inches in length, and the pivots therefor are raised 2 inches above the side bars 12. The cables 43, to which the said levers 46 and 47 are attached, are connected to the levers 24 15 inches above the pivot 25. The said cables are attached to the foot levers about 8 inches below the pintles 53.

The above stated construction and arrangement of the levers will result in an amplified power when applied by the hands at the cross bars 32 and by the feet at the treadles 55. It will be understood, however, that while I prefer the above arrangement and construction as productive of what appears to me the most economical employment of the force applied, I do not wish to be confined to such construction and arrangement specifically.

Having thus described my invention, what I claim as new and desire to secure by Letters Patent is:—

1. A railroad velocipede, comprising a hand lever pivotally mounted in the frame of the velocipede; a power multiplying lever link-connected with said hand lever and pivotally mounted in the frame of the machine below the mounting of said hand lever; a translating mechanism operatively connecting said power multiplying lever and the driving axle of the velocipede; and a plurality of foot treadles pivotally mounted in the frame of the velocipede and operatively connected with the said translating mechanism.

2. In a railroad velocipede of the character described, a driving mechanism comprising a crank wheel; a main rocking lever; a pitman connecting said wheel and said lever; and means for rocking said lever embodying hand operated and foot operated levers each operatively connected with said main rocking lever.

3. In a railroad velocipede of the character described, and in the driving mechanism therefor, a crank wheel; a rocking lever operatively connected with said wheel; a hand operated lever pivotally mounted to the frame of the velocipede; a link connecting the upper end of said rocking lever and said hand operated lever, said link being connected with said hand operated lever at a point removed from the fulcrum of said hand operated lever and at a distance therefrom less than the length of said rocking lever; and a foot power lever pivotally mounted on the frame of said velocipede and operatively connected with said rocking lever, the points of connection between the said foot lever and said rocking lever being closer to the mounting of said foot lever than to the mounting of said rocking lever.

4. In a railroad velocipede of the character described, and in the driving mechanism therefor, a main rocking lever pivotally mounted in the frame of the velocipede and in a dropped frame provided therefor; a hand operated lever pivotally mounted in the frame of the velocipede above the pivotal mounting of said main rocking lever; a link connecting the upper end of said rocking lever with said hand operated lever at a point removed from the fulcrum of said hand lever and at a distance therefrom less than the length of said rocking lever; a plurality of swinging foot levers flexibly connected to swing in unison; means connecting said foot levers with said rocking lever; and a translating mechanism interposed between the driving wheel of the velocipede and said rocking lever for transmitting a rotary motion to said driving wheel from said rocking lever.

In testimony whereof I have signed my name to this specification in the presence of two subscribing witnesses.

ISAAC JAY MOSSMAN.

Witnesses:
F. A. RICE,
C. H. CRAFT.

Copies of this patent may be obtained for five cents each, by addressing the "Commissioner of Patents, Washington, D. C."